United States Patent [19]

Kobayashi et al.

[11] 4,214,648

[45] Jul. 29, 1980

[54] VEHICLE DISC BRAKE

[75] Inventors: Toyoaki Kobayashi, Toyohashi; Masakazu Ishikawa, Toyota, both of Japan

[73] Assignees: Aisin Seiki Kabushiki Kaisha; Toyota Jidosha Kogyo Kabushiki Kaisha, both of Aichi, Japan

[21] Appl. No.: 857,036

[22] Filed: Dec. 2, 1977

[30] Foreign Application Priority Data

Dec. 3, 1976 [JP] Japan ................................ 51-145939

[51] Int. Cl.[2] ............................................ F16D 65/02

[52] U.S. Cl. .................................................. 188/73.3

[58] Field of Search .................... 188/71.1, 72.4, 72.5, 188/73.3, 73.4, 18 A

[56] References Cited

U.S. PATENT DOCUMENTS

| | | | |
|---|---|---|---|
| 3,199,635 | 8/1965 | Bessler et al. | 188/73.3 X |
| 3,299,991 | 1/1967 | DeCastelet | 188/71.1 |
| 3,478,845 | 11/1969 | Kita | 188/73.3 |
| 3,917,033 | 11/1975 | Rath et al. | 188/73.3 |
| 3,970,172 | 7/1976 | De Gennes | 188/73.4 |

FOREIGN PATENT DOCUMENTS

| | | | |
|---|---|---|---|
| 1207328 | 9/1970 | United Kingdom | 188/73.3 |
| 1355959 | 6/1974 | United Kingdom | 188/73.3 |

*Primary Examiner*—George E. A. Halvosa
*Attorney, Agent, or Firm*—Oblon, Fisher, Spivak, McClelland & Maier

[57] ABSTRACT

This invention concerns disc brakes of the kind in which pads are adapted to be urged by hydraulic fluid acting assembly into engagement with opposite faces of a friction disc. In a disc brake of this type in accordance with the present invention, the pads are directly supported by a stationary member secured to a stationary part of the vehicle chassis or body, while the fluid acting assembly is supported by an individual adapter which is in turn secured to the stationary part of the vehicle chassis or body so that the fluid acting assembly is freed from any affection of strain from the stationary member which normally tends to be strained under a known drag force when the brake is actuated.

7 Claims, 8 Drawing Figures

20'
11
20
15'
15
12
16'
14
10
16

11
20
18
23
19
17
12
16
8
10
7

220
220'
40
40'
212
211
215
215'
217
217'

VEHICLE DISC BRAKE

BACKGROUND OF THE INVENTION

1. Field of the Invention

This invention relates to a vehicle disc brake of the kind in which pads are adapted to be urged by hydraulic fluid acting means into engagement with opposite faces of a friction disc and more particularly to the type in which the pads as well as the hydraulic fluid acting means have a sliding fit on a stationary member secured to a stationary part, such as a known knuckle, of a vehicle chassis or body.

2. Description of the Prior Art

In this type, the stationary member is usually formed with a pair of parallel guiding rails for the pads to be slidably mounted thereon. The stationary member is also provided with a pair of parallel pin-like guiding members extending therefrom for slidably mounting the hydraulic fluid acting means. The hydraulic fluid acting means is usually provided in a caliper or saddle form, as herein referred to as "caliper", in order to straddle a peripheral portion of the disc together with the pads which, when actuated, is in abutment engagement therewith.

By the use of this type, it is possible to obtain practically a prompt and sensitive response of the caliper, which could not possibly be derived by other types.

There exists, however, a problem of this type for which solution is demanded. The problem is the known tendency of the stationary member to be strained due to the drag forces which, when actuated, are experienced by the pads and transferred to the stationary member. Such strain affects the pin-like members and causes the same to lose their presettled parallel relationship with the result that the caliper is prevented from restoring its awaiting or original position when the brake is released, with the pads being left engaged with the disc. Early wear of the pads is thus caused thereby.

SUMMARY OF THE INVENTION

A principal object of the invention is to provide a disc brake of the above type in which the pin like guiding members are freed from the affect of the strain in the stationary member.

According to the present invention, in a disc brake of the above type, the pin-like guiding members are not secured to the stationary member but are secured to an additional adapter which is secured to the stationary part of a vehicle chassis or body independently of the torque member.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENTS

Figure 1:
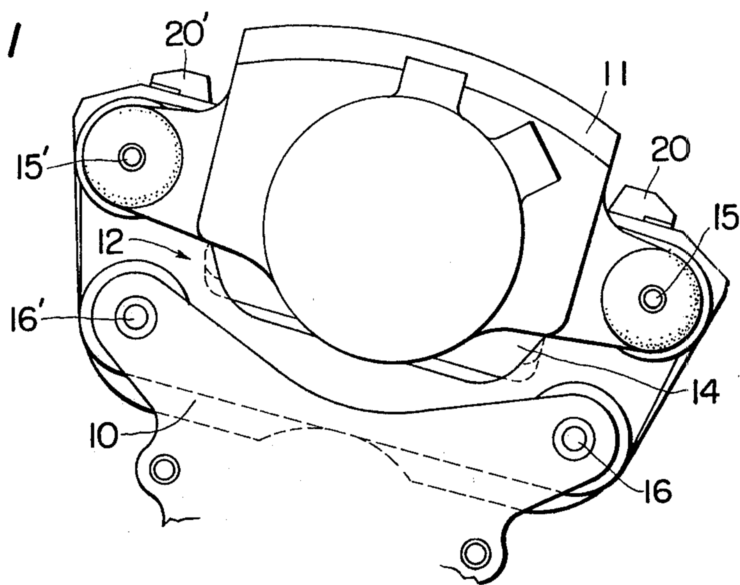
FIG. 1 is an end view of a disc brake embodying the invention.
Figure 2:
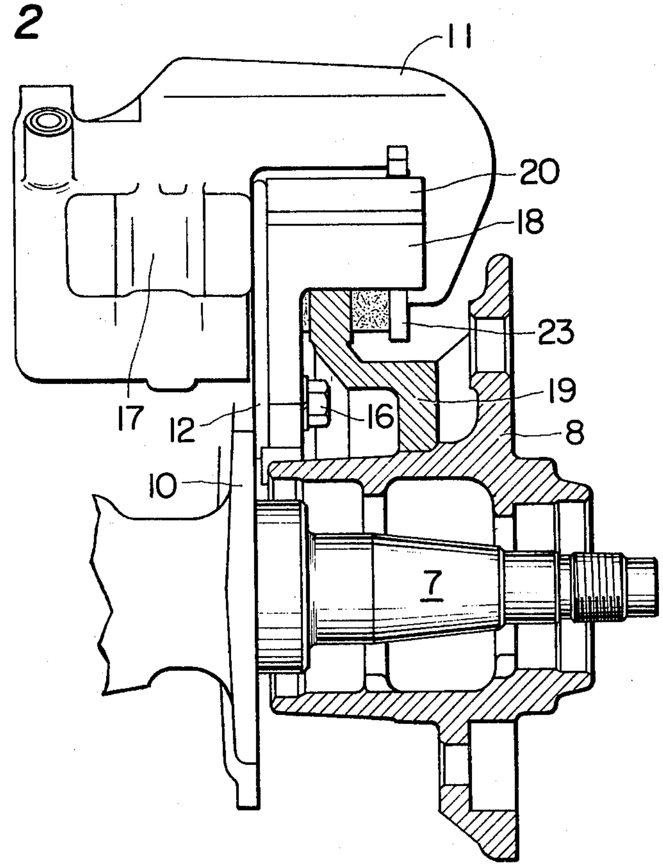
FIG. 2 is a sectional elevation through the brake disc and its associating parts.
Figure 3:
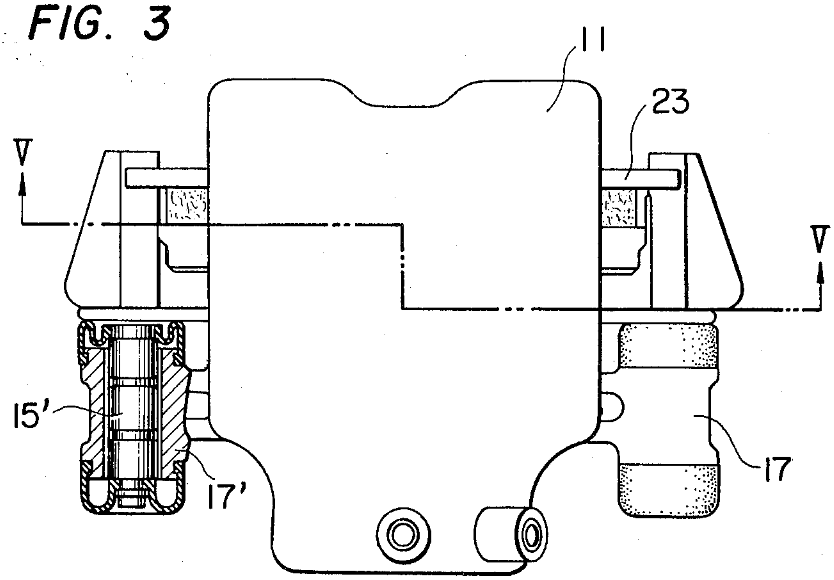
FIG. 3 is a plan view of the disc brake of FIG. 1.

The embodiment of disc brake illustrated in the drawings comprises a caliper generally designated 11 as best shown in FIGS. 1 to 3, being of generally U-shaped configuration with the bridge-like middle portion straddling a brake disc 19 (FIG. 2). A relatively fixed axle is shown at 7 upon which the brake of this invention is mounted. A wheel (not shown) including a flange 8 is rotatably mounted on the axle 7 on bearings (not shown) and may include a known rim for the support of a tire.

Figure 6:
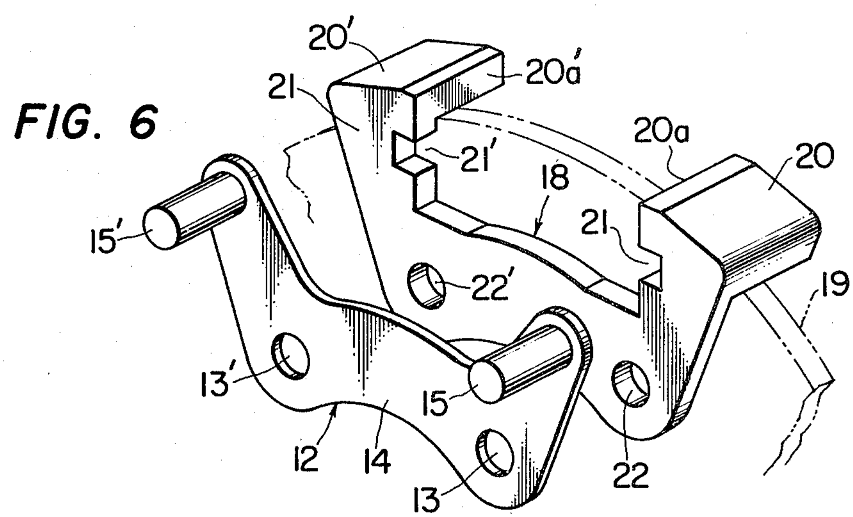
FIG. 6 is a perspective view showing essential parts of the embodiment of the invention.

The brake further includes a torque member 18 (FIG. 6) fixed to the stationary part 10 of the vehicle chassis or body and including a pair of axially extending guide rails 20 and 20'. The torque member 18 is formed with two holes 22 and 22' for receiving bolts (not shown) in bolting the member to the stationary part 10 as designated at 16 and 16' in FIG. 1 and FIG. 4. As best shown in FIG. 6, an adapter 12 has a similar configuration to the torque member 18 and is exclusively provided with a pair of axially extending parallel pins 15 and 15'. The adapter includes a central portion 14 and is further formed with a pair of non-tapped holes 13 and 13' respectively in alignment with the holes 22 and 22' in the torque member 18 to be bolted to the stationary part 10 by means of the common bolts 16 and 16', as will be seen in FIG. 4 at the central portion thereof. It should be noted that the guide rails 20 and 20' and the pins 15 and 15' are in parallel relation to each other and are directed along the axial direction of the disc 19.

Figure 4:
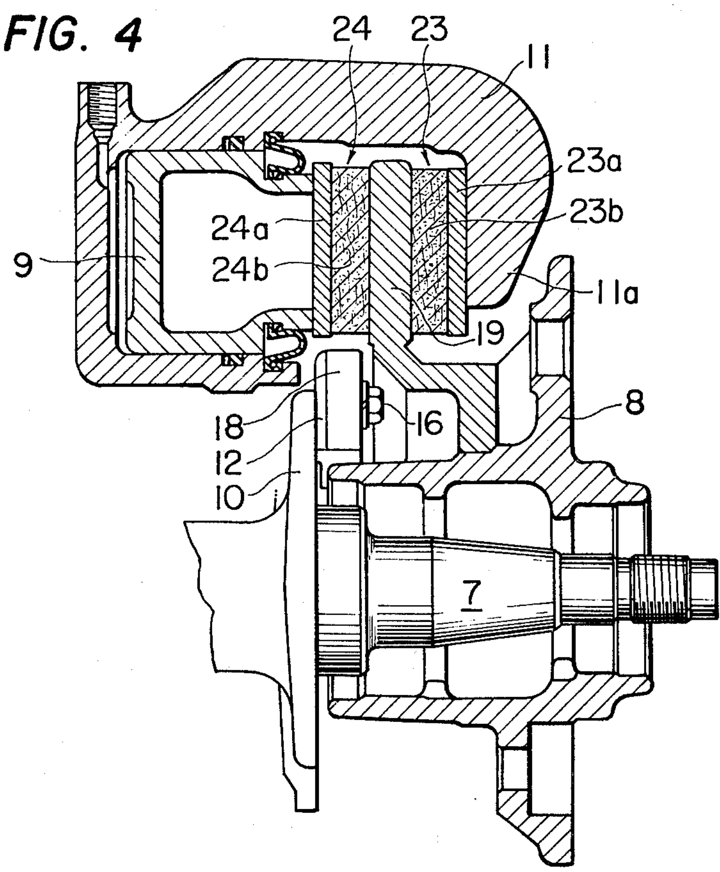
FIG. 4 is a sectional elevation through the brake caliper, of the disc brake of FIG. 1.

As shown in FIG. 4, the caliper 11 is internally formed to provide a hydraulic cylinder within which is received a hydraulic piston 9 displaceable toward the brake disc 19 responsive to hydraulic pressure in the cylinder. The piston 9 is normally in abutting engagement with a directly operated pad assembly 24 formed of a back plate 24*a* and a pad or lining 24*b*. The caliper has a pair of radially extending limbs 11*a* (only one of them is shown in FIG. 4) adapted to be normally in abutment engagement wih an indirectly operated pad assembly 23 formed of a backplate 23*a* and a pad 23*b*.

Figure 5:
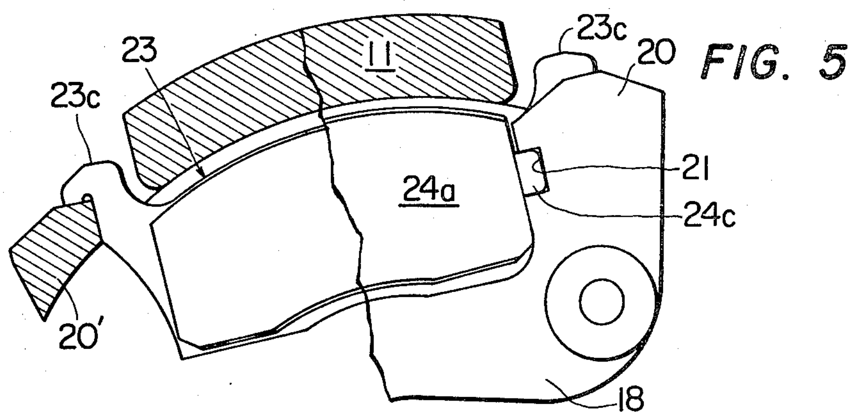
FIG. 5 is a cross sectional view taken along the line V—V in FIG. 3.

As will be more evident from FIG. 5, the pad assembly 23 is mounted for sliding movement on the guide rails 20 and 20' of the torque member 18, while the other pad assembly 24 is in engagement for sliding movement with a pair of rectangular notches 21 and 21' (FIG. 6). For such sliding movement, the backplate 23*a* is provided at both sides thereof with a pair of circumferentially extending lugs 23*c* and the back plate 24*a* is provided with at its both sides a pair of circumferentially extending lugs 24*c*. It should be noted that in FIG. 5 are shown half of the caliper and half of the torque member along the different cross section lines shown in FIG. 3 for illustration convenience.

Referring to FIG. 3, the caliper is externally formed to provide a boss at either side as shown at 17 and 17' in FIG. 3, one of the bosses being shown in axial cross section while the other is externally shown. Each boss has a close running fit on the corresponding pin of the adapter 12 (FIG. 6).

From what has been thus far described, it will be obvious that sliding movement of the caliper 11 occurs on the pins 15 and 15' as a result of the reaction set up when the friction pad assembly 24 is moved towards and engages the brake disc 19 responsive to actuation by the hydraulic piston 9. As a consequence of such movement, the second friction pad assembly 23 is urged towards the disc 19 responsive to the sliding movement of the caliper. As will be noted, in FIG. 5, the backplate **24*a* has its lugs 24*c* engaged to accept the notches 21 and 21' in the torque member 18, which are arranged to prevent both circumferential and radial displacement of the directly operated pad assembly 24. The other backplate 23 has its lugs 23*c* engaged to accept the internal faces of the guide rails 20 and 20' in the torque member 18, which are arranged in circumferentially spaced and axially directed arrangement to prevent similar displacement of the indirectly operated pad assembly 23**.

The drag forces experienced by the friction pad assemblies are transferred in the case of the directly operated pad assembly 24 to the torque member 18. In the case of the indirectly operated pad assembly 23, however, the drag forces are transferred through the both guide rails 20 and 20' and thence to the same torque member 18. It is to be noted that with this arrangement of pad assemblies and the torque member, there can be substantially no circumferential movement of the caliper relative to the torque member. The reason is that the caliper is merely in axial abutment relation with either pad assembly.

The drag taking construction and arrangement of the torque member 18 will be more evident from FIGS. 2, 4 and 6 which show that the torque member 18 has non-tapped holes 22 and 22' for receiving non-threaded middle portions of the bolts 16 and 16' with their threaded extremity portions received in correspondingly tapped holes in corresponding nuts. The bolts 16 and 16' are also commonly received in holes 13 and 13' in the adapter 12 in order to secure the adapter together with the torque member 18 to the stationary part 10.

From the foregoing, it will be apparent that there can be no torque transfer to the adapter 12 since the drag forces experienced by the pad assemblies 23, 24 and transferred to the torque members 18 will be restrained thereafter from being transferred beyond the torque member because of separate part relationship between the adapter 12 and the torque member 18. Accordingly, the strain due to the drag forces is substantially nil in the adapter 12 so that the preset parallel relationship is ensured between the pins 15 and 15', prompt and sensitive movement of the caliper being thus ensured to the varying brake operating fluid pressure within the cylinder. The desired safety is thus achieved in braking operation of the disc brake.

Figure 7:
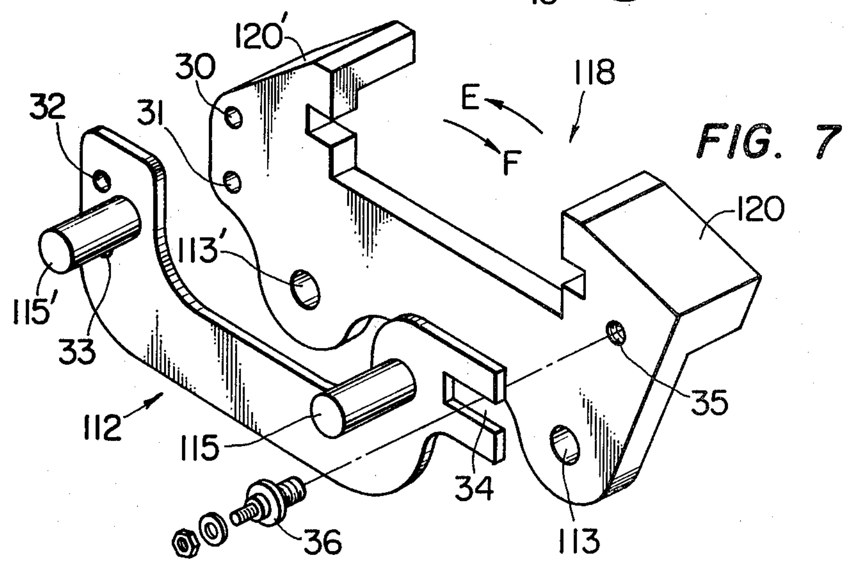
FIG. 7 is a similar view of another embodiment of the invention.

Alternatively, the sliding supporting means for the caliper 11 can be replaced by the construction and arrangement shown in FIG. 7. In FIG. 7, parts which are the same as those shown in FIGS. 1 to 6 are designated by the same numerals in 100 series for conveniently understand the second embodiment. In the second embodiment, the adapter 112 is secured to the torque member 118 by means of nontapped holes 30 and 31 in the torque member and non-tapped holes 32 and 33 in the adapter and further two bolts (not shown) received in these holes. The right hand side of the adapter is, however, formed with a circumferentially elongated and opened eye or slot 34 adapted to receive therein a common bolt 36 which is further received in a nontapped hole 35 in the torque member 118. Although the common bolt 36 clamps together the torque member 118 and the adapter 112 to tighten them, it allows circumferentially slight relative displacement between the two members so that any strain caused in the torque member 118 due to the drag forces does not affect the adapter 112. It will be noted that a similar desired result can be obtained by the second embodiment.

Figure 8:
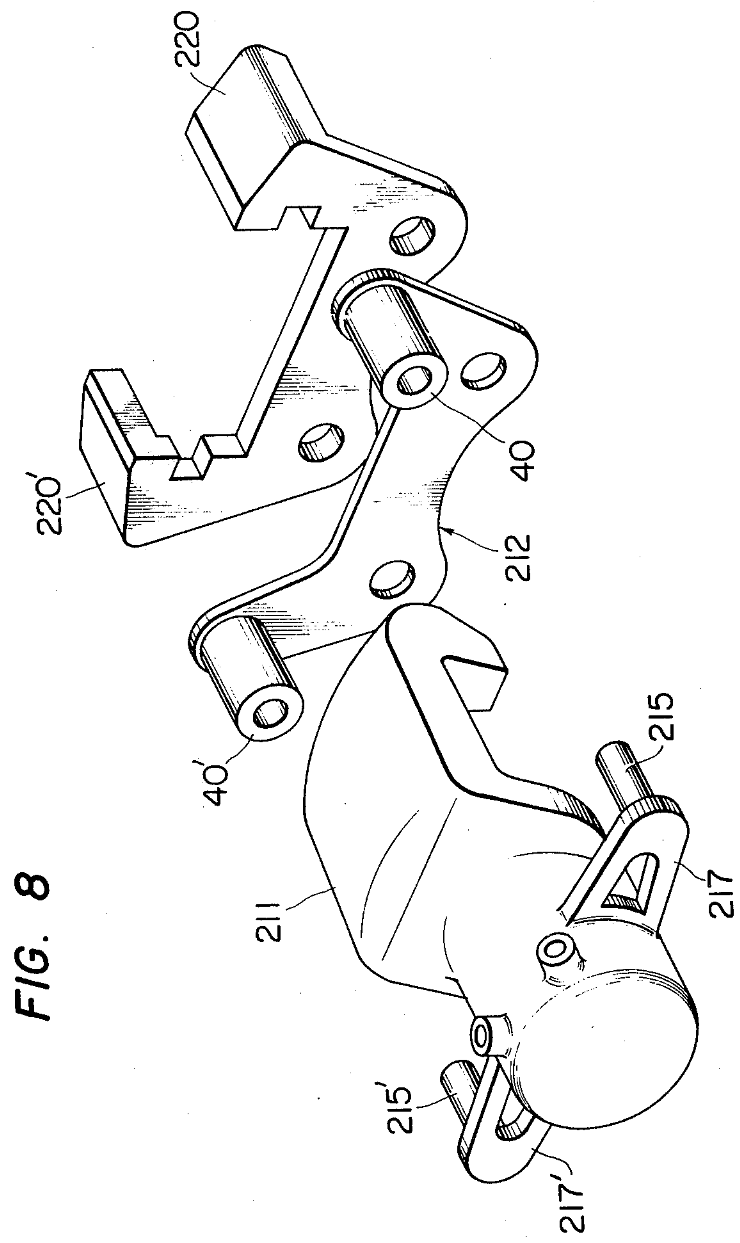
FIG. 8. is a similar view of a third embodiment of the invention.

In FIG. 8 is shown a third embodiment of the invention. In this embodiment, the caliper 211 has at either side thereof an extending lug designated 217 or 217'. At the extremity of each lug is an axially extending pin designated by reference numeral 215 or 215' in this view. The pins are slidably received in the bosses 40 and 40' axially extending from the adapter at both sides in alignment with the pins. In FIG. 8, parts which are the same as those of the first embodiment are designated by the same numerals in 200 series, so that no further description is considered to be necessary in understanding the third embodiment. It will be apparent that the same desired result is obtainable by the third embodiment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A disc brake which comprises a rotatable disc fixed to a rotating part of a vehicle chassis or body for rotation therewith, a pad assembly of friction material arranged on each side of said disc, a torque member fixed to a stationary part of the vehicle chassis or body and having pad assembly retaining means for supporting said pad assemblies adjacent opposite sides of said disc for axial sliding movement into engagement with said disc and preventing rotational movement thereon, an adapter being a separate and distinct part from said torque member and fixed to said stationary part in neighboring relation with the torque member so as to provide relief of clamping forces and drag forces due to normal tolerance when the brake is actuated, a caliper connected to said adapter, a pair of pilot means axially extending exclusively from and connected to one of said adapter and said caliper, said caliper being mounted for axial sliding movement over said disc as well as said pad assemblies and having means provided to effect said axial movement of said pad assemblies into engagement with said disc, said pilot means further comprising a pair of parallel pins axially extending from one of said adapter and said caliper and a pair of bosses extending from the other of said adapter and said caliper respectively in alignment with said pins for slidably receiving therein said pins for axial movement of said caliper.

2. A disc brake according to claim 1, in which said pad assembly retaining means comprises a pair of axially extending parallel guide rails for slidably supporting one of said pad assemblies for axial movement and preventing rotational movement thereof and a pair of spaced apart notches for slidably supporting the other pad assembly for axial movement and preventing rotational movement thereof, said one of said pad assemblies having a pair of lugs each for axial sliding engagement with corresponding one of said guide rails, and said other pad assembly having a pair of lugs each for axial sliding engagement with corresponding one of said notches and preventing rotational movement thereof.

3. A disc brake according to claim 2, in which said adapter and said torque member are lapped over each other and are bolted together to said stationary part to be held together adjacent one side of said disc.

4. A disc brake according to claim 3, in which said torque member and said adapter both have a pair of spaced apart axial holes for receiving bolts therein for bolting thereof to said stationary part of the vehicle chassis or body.

5. A disc brake according to claim 4, in which said holes in said torque member are in alignment with said holes in said adapter for receiving therein common bolts to be bolted together to said stationary part of the vehicle chassis or body.

6. A disc brake according to claim 1 wherein said adapter and said torque member have a similar configuration.

7. A disc brake comprising a rotatable disc fixed to a rotating part of a vehicle chassis or body for rotation therewith, a pad assembly of friction material arranged on each side of said disc, a relatively fixed torque member adapted to be fixed to a stationary part of the vehicle chassis or body and having pad assembly retaining means for supporting said pad assemblies adjacent opposite sides of said disc for axial sliding movement into engagement with said disc and preventing rotational movement thereon, an adapter to be fixed to said stationary part of the vehicle chassis or body and having spaced apart pilot means axially extending therefrom, and a caliper mounted for axial sliding movement on said pilot means over said disc as well as said pad assemblies having means operable to effect said axial movement of said pad assemblies into engagement with said disc wherein:

said pad assembly retaining means comprises a pair of axially extending parallel guide rails for slidably supporting one of said pad assemblies for axial movement and preventing rotational movement thereof and a pair of spaced apart notches for slidably supporting the other pad assembly for axial movement and preventing rotational movement thereof, said one of said pad assemblies having a pair of lugs each for axial sliding engagement with corresponding one of said guide rails, and said other pad assembly having a pair of lugs each for axial sliding engagement with corresponding one of said notches and preventing rotational movement thereof;

said adapter and said torque member are lapped over each other and bolted together to said stationary part of the vehicle chassis or body adjacent one side of said disc for providing said pad assembly retaining means and said spaced apart pilot means for slidably mounting said caliper as well as said pad assemblies;

said torque member having a pair of spaced apart axial holes for receiving bolts therein for bolting thereof to said stationary part of the vehicle chassis or body; and said adapter is bolted to said torque member at one side by means of at least two spaced apart bolts and formed at the other side with a circumferentially elongated and opened slot for receiving a bolt axially extending from said torque member for bolting together said torque member and said adapter at said other side.

* * * * *